United States Patent
Boisset et al.

(10) Patent No.: US 11,454,518 B2
(45) Date of Patent: Sep. 27, 2022

(54) METHOD FOR DETERMINING A MEASUREMENT SIGNAL ACCORDING TO THE ELECTRICAL SIGNAL AT THE OUTPUT OF A SENSOR

(71) Applicants: Continental Automotive France, Toulouse (FR); Continental Automotive GmbH, Hannover (DE)

(72) Inventors: Jean-Philippe Boisset, Montauban (FR); Davy Ribreau, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 106 days.

(21) Appl. No.: 16/646,613

(22) PCT Filed: Sep. 21, 2018

(86) PCT No.: PCT/EP2018/075559
§ 371 (c)(1),
(2) Date: Mar. 12, 2020

(87) PCT Pub. No.: WO2019/057869
PCT Pub. Date: Mar. 28, 2019

(65) Prior Publication Data
US 2020/0256703 A1   Aug. 13, 2020

(30) Foreign Application Priority Data
Sep. 22, 2017 (FR) .......... 1758796

(51) Int. Cl.
*G01D 3/036* (2006.01)
*G01D 3/02* (2006.01)
(Continued)

(52) U.S. Cl.
CPC .......... *G01D 3/0365* (2013.01); *G01D 3/02* (2013.01)

(58) Field of Classification Search
CPC ........ G01D 3/02; G01D 3/0365; G01P 21/00; H03M 1/0609
(Continued)

(56) References Cited

U.S. PATENT DOCUMENTS 4,450,716 A   5/1984  Lefaucheux et al.
6,560,555 B1  5/2003  Mallory
(Continued)

FOREIGN PATENT DOCUMENTS

CN   1865896 A   11/2006
CN   104228489 A  12/2014
(Continued)

OTHER PUBLICATIONS

English translation of JP 2009049645, Mar. 5, 2009. (Year: 2009).*
(Continued)

*Primary Examiner* — Michael P Nghiem
(74) *Attorney, Agent, or Firm* — RatnerPrestia

(57) ABSTRACT

A method for determining a measurement signal based on a sensor output electrical signal. The electrical signal based on the measured quantity conversion of the electrical signal into a measurement signal. Determining the measurement signal for least two pairs of values by converting the electrical (Continued)

signal into a measurement signal for at least two predetermined electrical signal values, each pair of values including the electrical signal and measurement signal. A mathematical function allowing a measurement signal to be obtained based on the electrical signal is determined based on the pairs of values. The measurement signal being substantially equal to the measurement signal obtained by applying the sensor conversion to the same sensor electrical signal. At least two measurement signals are determined without sensor conversion. Acquisition of the two measurement signals separated by a time shorter than the time to convert an electrical signal into a measurement signal by sensor conversion.

9 Claims, 1 Drawing Sheet

(51) Int. Cl.
G01P 21/00 (2006.01)
H03M 1/06 (2006.01)

(58) Field of Classification Search
USPC .......................................................... 702/104
See application file for complete search history.

(56) References Cited

U.S. PATENT DOCUMENTS

| | | |
|---|---|---|
| 7,197,922 B2 | 4/2007 | Rimkus et al. |
| 2013/0218502 A1* | 8/2013 | Artiuch ................ G01L 27/005 |
| | | 702/98 |
| 2014/0372006 A1 | 12/2014 | Hammerschmidt |
| 2014/0376586 A1 | 12/2014 | Dawson et al. |

FOREIGN PATENT DOCUMENTS

| | | | |
|---|---|---|---|
| FR | 2485192 A1 | 12/1981 | |
| JP | 2009049645 A * | 3/2009 | |
| WO | WO-2010106336 A1 * | 9/2010 | ............ G01B 11/06 |
| WO | 2014160912 A2 | 10/2014 | |

OTHER PUBLICATIONS

Chinese Office Action for Chinese Application No. 201880061219.9, dated May 28, 2021, with translation, 10 pages.

International Search Report and Written Opinion for International Application No. PCT/EP2018/075559, dated Dec. 14, 2018, 9 pages.

Yuanfeng, S., "Automobile Tire Pressure Monitoring Based on Nano-Polysilicon Film Pressure Sensor," Mar. 27, 2016, 198 pages, Electronic Journal of China's Master Theses Full-text Database, No. 3, with English translation.

* cited by examiner

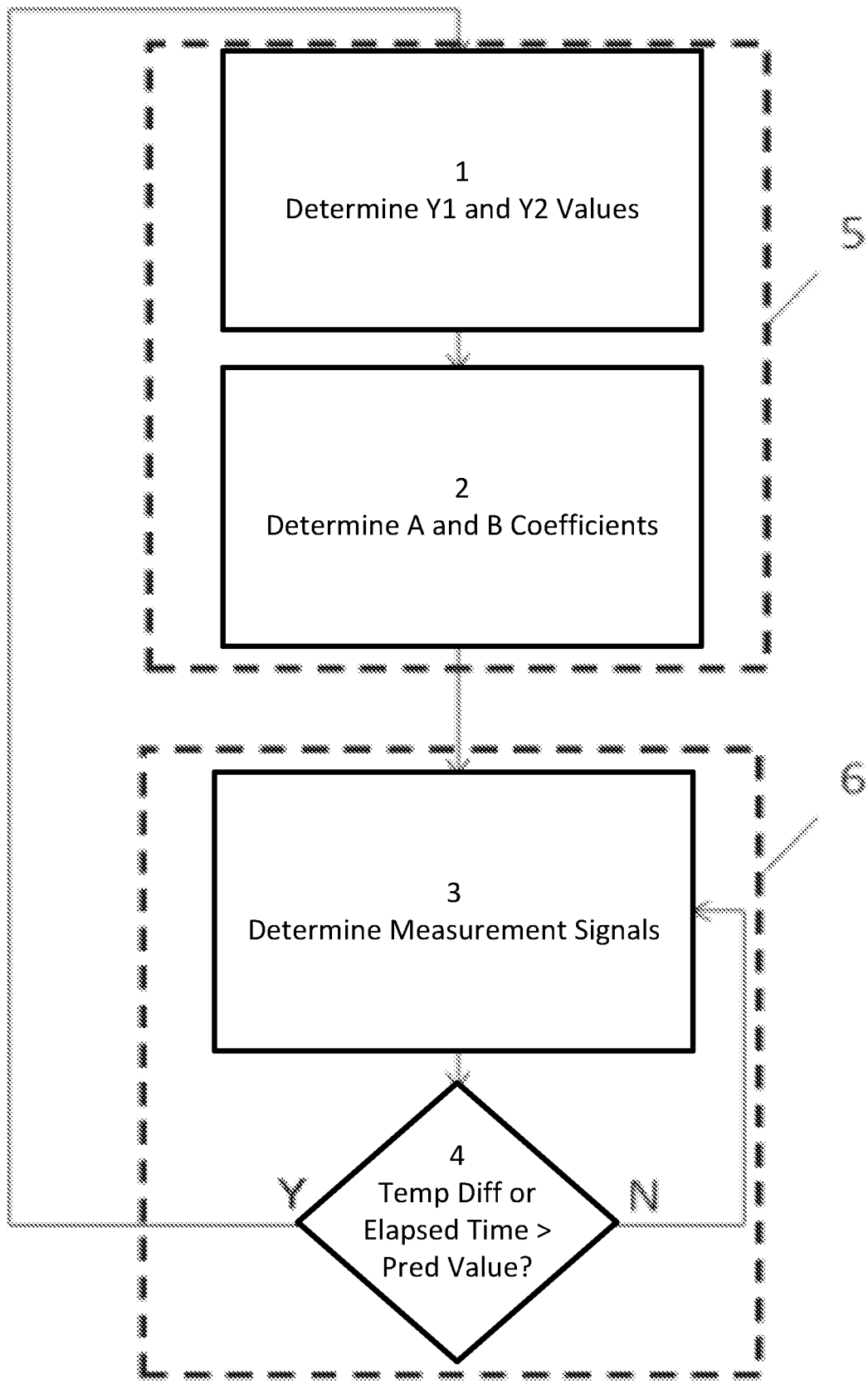

METHOD FOR DETERMINING A MEASUREMENT SIGNAL ACCORDING TO THE ELECTRICAL SIGNAL AT THE OUTPUT OF A SENSOR

CROSS REFERENCE TO RELATED APPLICATIONS

This application is the U.S. National Phase Application of PCT International Application No. PCT/EP2018/075559, filed Sep. 21, 2018, which claims priority to French Patent Application No. 1758796, filed Sep. 22, 2017, the contents of such applications being incorporated by reference herein.

FIELD OF THE INVENTION

The technical field of the invention is the measurement of physical quantities by means of a sensor, and in particular the conversion of the electrical signal of a sensor into a measurement signal.

BACKGROUND OF THE INVENTION

A sensor generally comprises a transducer and conversion electronics.

The transducer is capable of generating an electrical signal on the basis of the quantity to be determined. In the case of a digital sensor (as opposed to an analog sensor), the electrical signal comprises an amplitude dependent on a discretized reference scale. A signal of this type is commonly employed in digital electronics (in contrast to analog electronics, in which the amplitudes vary continuously).

However, in order to be able to be used, the electrical signal of the sensor has to be converted into a measurement signal by the conversion electronics so as to associate a measurement value with the amplitude on the basis of the discretization chosen over the range of values that can be measured by the sensor. "Range of values" is intended to mean all of the values that can be measured between the minimum value that can be measured and the maximum value that can be measured.

The time taken to convert the electrical signal into a measurement signal varies depending on the sensor concerned. If the conversion time is longer than the time interval between two measurements, the sensor cannot provide values in real time.

SUMMARY OF THE INVENTION

There is therefore a need for a determination method that allows the measurement signal of a sensor to be obtained rapidly on the basis of the electrical signal at the output of said sensor.

There is also a need for a determination method that allows the deviations of the electrical signal at the output of the sensor to be corrected when determining the measurement signal.

An aspect of the invention relates to a method for determining a measurement signal on the basis of the electrical signal at the output of a sensor, the sensor comprising a transducer capable of generating an electrical signal on the basis of the quantity to be measured and a conversion of the electrical signal into a measurement signal on the basis of at least one range of values that can be measured by the sensor and at least one physical parameter other than the quantity to be measured that can affect the amplitude of the generated electrical signal. The method comprises the following steps:

at a first instant, the measurement signal for at least two pairs of values is determined by applying the conversion of the electrical signal into a measurement signal to at least two predetermined electrical signal values, each pair of values comprising the electrical signal and the measurement signal, and a mathematical function that allows a measurement signal to be obtained on the basis of the electrical signal generated by the sensor is determined on the basis of the pairs of values comprising the electrical signal and the corresponding measurement signal, the measurement signal obtained by the mathematical function being substantially equal to the measurement signal obtained by applying the sensor conversion to the same sensor electrical signal, then at a second instant, at least two measurement signals are determined by applying the mathematical function to at least two electrical signals of the sensor without using the sensor conversion, the acquisitions of the two measurement signals being separated by a length of time shorter than the time taken to convert an electrical signal into a measurement signal by the sensor conversion.

According to one exemplary implementation, the mathematical function is determined by bisection.

According to another exemplary implementation, the mathematical function is determined by regression.

The sensor may be a sensor for monitoring the pressure of a tire, in which case the mathematical function is a linear function, in which case at least two pairs of values are needed to determine the gradient and the y-intercept of the linear function.

In order to determine the gradient and the y-intercept of the linear function, the following steps may be applied:

for each of the pairs of values, the ordinate is determined by applying the sensor conversion to a predetermined abscissa, then the gradient is determined as the ratio of the difference between the ordinate of the second pair of values and the ordinate of the first pair of values to the difference between the abscissa of the second pair of values and the abscissa of the first pair of values, then the y-intercept is determined as the difference between the ratio of the ordinate of one of the pairs of values to the gradient and the abscissa of said pair of values.

The predetermined abscissa of the first pair of values and the predetermined abscissa of the second pair of values may each be near a limit of the range of electrical signals that can be delivered by the sensor.

According to one exemplary embodiment:

the temperature during the determination of the gradient and of the y-intercept of the linear function is stored, a value of the temperature difference between the present temperature and the temperature during the determination of the gradient and of the y-intercept of the linear function is determined, it is determined whether the value of the temperature difference is higher than a predefined temperature difference value, and, if so, renewed determination of the gradient and of the y-intercept of the linear function is ordered.

According to one exemplary implementation:

the instant at which the gradient and the y-intercept of the linear function are determined is stored, a value of the elapsed time is determined on the basis of the present instant and the instant at which the gradient and the y-intercept of the linear function were determined, it is determined whether the value of the elapsed time is higher than a predefined elapsed time value, and, if so, renewed determination of the gradient and of the y-intercept of the linear function is ordered.

Other aspects, features and advantages of the invention will become apparent upon reading the description that follows, which is provided solely by way of nonlimiting example and with reference to the appended drawing, in which the sole FIGURE illustrates the main steps in a determination method according to an aspect of the invention.

BRIEF DESCRIPTION OF THE DRAWINGS

The FIGURE illustrates a method according to an aspect of the invention.

DETAILED DESCRIPTION OF THE PREFERRED EMBODIMENTS

An aspect of the invention is described below in the context of application to a TPMS (Tire Pressure Monitoring System) sensor for monitoring the pressure of tires. Without exercising inventive skill, a person skilled in the art will understand that the teaching below can be applied more generally to any sensor that has a (software- or hardware-based) conversion which can be interpreted as an algebraic equation, at least given the assumption of a constant parameter. The algebraic equation can then be determined using a number of points determined during an initialization step by means of the sensor conversion, the number of points being dependent on the degree of the polynomial form resembling the algebraic equation (for a first-degree polynomial form, two points are sufficient; for a second-degree polynomial form, at least three points are needed). At a subsequent stage, the algebraic equation is employed for real-time applications in order to associate a measurement signal with each electrical signal originating from the sensor upon each measurement.

It will be recalled that a TPMS system (Tire Pressure Monitoring System) according to the prior art comprises a TPMS receiver connected to at least one TPMS sensor arranged on a wheel of a vehicle. In general, each wheel of the vehicle is fitted with a TPMS sensor. There are now a variety of applications based on the measurement signal from the TPMS system or sensors.

In the case of a TPMS sensor, it is in particular the radial acceleration experienced by the TPMS sensor that is measured. The corresponding conversion then takes into account the effect of various physical parameters, in particular temperature and the drifts that can occur due to the aging or the design of the sensor. The conversion is then governed by a quadratic equation specific to each type of sensor. Not only is said equation non-invertible, it is also generally owned by the manufacturer of the sensor, as a result of which its availability is restricted.

Due to the complexity of the computation associated with this equation, the conversion takes considerable time, which can exceed the maximum admissible time between two measurements for certain applications. The TPMS sensor can then no longer be used in real time.

In order for the time between acquisitions to be longer than the measurement time of the TPMS sensor, a conversion equation is needed so as to determine a measurement signal on the basis of the electrical signal at the output of the TPMS sensor without using the sensor conversion.

Following statistical research, the inventors realized that the sensor conversion linking the electrical signal at the output of the TPMS sensor to the measurement signal varies linearly for a given temperature and a given aging.

Thus, they determined that a first-degree polynomial equation links the measurement signal and the electrical signal at a constant temperature and with constant aging. The coefficients of an equation of this kind can be determined on the basis of a few pairs of values of the electrical signal and of the measurement signal. A few predetermined values of the electrical signal are provided with an associated value of the measurement signal by applying the sensor conversion to them. Determination of this kind will be described in more detail further below.

This first step, which takes significant computation time due to the use of the sensor conversion, can be performed prior to a series of rapid measurements to be taken in real time and at predetermined instants. Since it is predicated on constant conditions in terms of temperature and aging of the TPMS sensor, it is performed periodically, in order to take account of aging, and after a notable change in temperature.

Once the polynomial equation has been determined for constant conditions (temperature, age of the TPMS sensor), a measurement signal can rapidly be associated with an electrical signal originating from the sensor.

This second step allows measurements to be taken in real time on a sensor that has a conversion (also known as transfer function) which takes longer than the time between two measurements.

The various methods for determining the polynomial equation will now be described.

The polynomial equation that allows a value of the measurement signal ACC to be determined on the basis of the electrical signal RAW at constant temperature and with constant aging of the sensor is in the following form:

$$ACC = (A * \text{RAW}) + B \quad (\text{Eq. 1})$$

where:
A: gradient,
B: y-intercept.

It should be noted that, in the context of the TPMS sensor as has been described above, the measurement signal ACC is a radial acceleration value.

A dynamic approach based on a bisection can be used to determine coefficients A and B.

For this purpose, during a first step, a value of the gradient A, a value of a minimum limit Amin for the interval of values of the gradient, a value of a maximum limit Amax for the interval of values of the gradient, and a reference acceleration value ACCref are initialized.

The inverse polynomial equation is defined by inverting equation Eq. 1.

$$\text{RAW} = C * ACC + D \quad (\text{Eq. 2})$$

where $C = -1/A$ and
$D = B/A$

During a second step, a calculated value RAW_calc of the electrical signal of the sensor is determined on the basis of the value ACCref by applying the inverse polynomial equation Eq. 2.

During a third step, a computational value ACCcalc of the measurement signal is determined on the basis of the calculated value RAW_calc of the electrical signal of the sensor by using the sensor conversion.

During a fourth step, it is determined whether the values ACCref and ACCcalc are equal and whether the absolute value of the difference between Amin and Amax is less than 1.

If so, it is determined that the gradient is equal to the value A.

Otherwise, the method continues with a fifth step during which a new value of the gradient A is determined by performing the following calculation:

$$A = A\text{min} + ((A\text{max} - A\text{min})/2) \quad \text{(Eq. 3)}$$

New values of Amin and Amax are then defined by dividing the interval of values of A [Amin, Amax] by two. More specifically, if the reference acceleration value ACCref is higher than the computational value ACCcalc of the measurement signal, a new value Amin equal to the gradient A determined by applying equation Eq. 3 is defined, while the value Amax is kept unchanged.

Conversely, if the reference acceleration value ACCref is lower than the computational value ACCcalc of the measurement signal, a new value Amax equal to the gradient A is defined, while the value Amin is kept unchanged.

The method then returns to the second step.

It should be noted that, in order to determine coefficient D, coefficient B of equation Eq. 1 is first determined by determining the difference between the computational value ACCcalc of the measurement signal and the product of the value A and the electrical signal RAW_calc, and coefficient D is then determined by applying equation Eq. 2.

It is also possible to solve a system of appropriately chosen equations in order to determine coefficients A and B.

It will be recalled that two points suffice to determine a straight line. Let us consider a first point with coordinates (X1, Y1) and a second point with coordinates (X2, Y2), the ordinates Y1, Y2 being values of the measurement signal ACC of the sensor, and the abscissae X1, X2 being values of the electrical signal RAW of the sensor.

If equation Eq. 1 is applied to the coordinates of the first point and of the second point, the following equation system is then obtained:

$$\begin{cases} Y1 = A*X1 + B \\ Y2 = A*X2 + B \end{cases} \quad \text{(Eq. 4)}$$

Combining the two equations to eliminate coefficient B gives:

$$A = \frac{Y2 - Y1}{X2 - X1} \quad \text{(Eq. 5)}$$

Since coefficient A is known, the expression of coefficient B is obtained from either one of the equations of system Eq. 4. Below, coefficient B is determined from the second equation of system Eq. 4:

$$B = \frac{[Y2 - (A*X2)]}{A} \quad \text{(Eq. 6)}$$

A person skilled in the art will understand that the y-intercept B can be determined using the coordinates of the first point by substituting those coordinates for the coordinates of the second point in equation Eq. 6, with the result obtained then being identical.

The precision with which coefficients A and B are determined is then dependent on the distance between the first point (X1, Y1) and the second point (X2, Y2).

The method for determining a measurement signal on the basis of the electrical signal at the output of a sensor thus comprises the following steps illustrated by the FIGURE.

During a first step 1, the values Y1 and Y2 are determined by applying the sensor conversion to predefined values X1 and X2. The values X1 and X2 are at the upper and lower limits, respectively, of the range of electrical signals that can be delivered by the sensor.

During a second step 2, coefficients A and B are then determined on the basis of equations Eq. 5 and Eq. 6 and the coordinates (X1, Y1) and (X2, Y2).

Since coefficients A and B and also equation Eq. 1 are known, the measurement signals Yi associated with any electrical signal Xi delivered by the sensor can then be determined during a third step 3 without using the sensor conversion. Since the calculation required for a determination of this kind involves a multiplication and an addition, it takes a much shorter time and is much more sparing of computational power than solving a quadratic equation.

Coefficients A and B remain valid as long as the temperature does not vary by a difference greater than a predefined value linked to the thermal drifts of the sensor, or until a time longer than a predefined value linked to the drifts of the sensor due to aging has elapsed.

In order to ensure that these conditions are correctly observed, the temperature during the determination of coefficients A and B and the instant at which they are determined are stored during the second step 2. During a fourth step 4, a value of the temperature difference and a value of the elapsed time are determined, and then the value of the temperature difference is compared with a predefined temperature difference value, and the value of the elapsed time is compared with a predefined elapsed time value. If either one of the determined values is higher than the corresponding predefined value, the method returns to step 1 in order to determine new coefficients A and B. A first set of steps 5 comprising the first step 1 and the second step 2 is performed at a first instant prior to the real-time measurements so that the time taken by these steps does not adversely affect the targeted application. In other words, the time taken by the first set of steps 5 does not spill over into the real-time measurement period.

A second set of steps 6 comprising the third step 3 and the fourth step 4 is performed at a second instant subsequent to the first instant, during which the measurement signals have to be determined in real time on the basis of the electrical signals of the sensor.

The determination method thus allows a measurement signal to be determined on the basis of an electrical signal of the sensor without using the sensor conversion and while taking into account the effects of temperature and of aging. Indeed, the drifts caused by these two parameters are integrated into the polynomial equation upon each new determination.

The invention claimed is:

1. A method for determining, by a processor of a vehicle, a measurement signal, based on an electrical signal, at an output of a tire sensor arranged on a wheel of the vehicle, the tire sensor of the vehicle comprising a transducer capable of generating the electrical signal based on radial acceleration measured by the tire sensor and comprising a conversion of the electrical signal into a measurement signal of the radial acceleration of the tire sensor of the vehicle and at least one physical parameter to be measured other than the measured radial acceleration that can affect an amplitude of the generated electrical signal, the method comprising:
- at a first instant, determining, by the processor of the vehicle, respective measurement signals for at least two pairs of values by applying the tire sensor conversion of respective electrical signals into the respective measurement signals of the radial acceleration to at least two predetermined electrical signal values, each pair of values comprising the respective electrical signals and the respective measurement signals, and
- at a second instant, determining, by the processor of the vehicle, a mathematical function that is substantially equivalent to the tire sensor conversion, the mathematical function allowing the respective measurement signals to be obtained based on the respective electrical signals generated by the tire sensor of the vehicle is determined based on the pairs of values comprising the respective electrical signals and the respective measurement signals, and then
- at a third instant, determining, by the processor of the vehicle, at least two measurement signals of the radial acceleration by applying the mathematical function to at least two electrical signals of the tire sensor of the vehicle without using the tire sensor conversion,
- wherein the determination of the at least two measurement signals via the mathematical function at the third instant are separated by a length of time shorter than a time taken to convert the at least two electrical signals into the at least two measurement signals of the radial acceleration by the tire sensor conversion in the first instant, and
- executing, by the processor of the vehicle, a vehicle application that utilizes the radial acceleration of the at least two measurement signals determined at the second instance.

2. The method as claimed in claim 1, wherein the mathematical function is determined by bisection.

3. The method as claimed in claim 1, wherein the mathematical function is determined by regression.

4. The method as claimed in claim 3, wherein the sensor is a sensor for monitoring the pressure of a tire, and the mathematical function is a linear function, the at least two pairs of values being needed to determine a gradient and a y-intercept of the linear function.

5. The method as claimed in claim 4, wherein, in order to determine the gradient and the y-intercept of the linear function, the method further comprises:
- for a first pair of values of the at least two pairs of values, an ordinate of the first pair of values is determined by applying the sensor conversion to a predetermined abscissa of the first pair of values,
- for a second pair of values of the at least two pairs of values, an ordinate of the second pair of values is determined by applying the sensor conversion to a predetermined abscissa of the second pair of values, then
- the gradient is determined as a ratio of a difference between the ordinate of the second pair of values and the ordinate of the first pair of values to the difference between the predetermined abscissa of the second pair of values and the predetermined abscissa of the first pair of values, then
- the y-intercept is determined as a difference between a ratio of the ordinate of one of the pairs of values to the gradient and the predetermined abscissa of said pair of values.

6. The method as claimed in claim 5, wherein the predetermined abscissa of the first pair of values and the predetermined abscissa of the second pair of values are each near a limit of a range of electrical signals that can be delivered by the sensor.

7. The method as claimed in claim 4, wherein:
- a temperature during the determination of the gradient and of the y-intercept of the linear function is stored,
- a value of a temperature difference between a present temperature of the sensor and a temperature of the sensor during the determination of the gradient and of the y-intercept of the linear function is determined,
- determine whether the value of the temperature difference is higher than a predefined temperature difference value, and
- if so, renewed determination of the gradient and of the y-intercept of the linear function is ordered.

8. The method as claimed in claim 4, wherein:
- an instant at which the gradient and the y-intercept of the linear function are determined is stored,
- a value of an elapsed time is determined based on a present instant and the instant at which the gradient and the y-intercept of the linear function were determined,
- determine whether the value of the elapsed time is higher than a predefined elapsed time value, and
- if so, renewed determination of the gradient and of the y-intercept of the linear function is ordered.

9. The method as claimed in claim 1, wherein the at least one physical parameter is temperature measured by the tire sensor, and the tire sensor conversion is performed based on the temperature measured by the tire sensor.

* * * * *